United States Patent [19]

Gregg et al.

[11] 4,108,011
[45] Aug. 22, 1978

[54] SYNCHRONOUS DRIVE BELT AND PULLEY CONFIGURATION THEREFOR

[75] Inventors: Michael John William Gregg, Lisburn; David Bell, Bangor, both of Northern Ireland

[73] Assignee: The Goodyear Tire & Rubber Company, Akron, Ohio

[21] Appl. No.: 765,575

[22] Filed: Feb. 4, 1977

[30] Foreign Application Priority Data

Feb. 13, 1976 [GB] United Kingdom ............... 05794/76

[51] Int. Cl.² .......................... F16H 7/00; F16G 1/28
[52] U.S. Cl. ..................................... 74/229; 74/231 C
[58] Field of Search ...................... 74/231 C, 229, 219

[56] References Cited

U.S. PATENT DOCUMENTS 3,756,091  9/1973  Miller ................................. 74/231 C
4,007,644  2/1977  Weinberger ........................ 74/231 C
4,016,772  4/1977  Clemens et al. ........................ 74/229

Primary Examiner—Leonard H. Gerin
Attorney, Agent, or Firm—L. A. Germain; R. P. Yaist

[57] ABSTRACT

A configuration for a synchronous drive belt and pulley combination wherein each belt tooth has at least part of its fore and aft flank surfaces shaped in cross-section as the arc of a circle the radius of which is centered on the pitch line of the belt a distance W apart. Each tooth-engaging pulley cavity has at least part of its fore and aft surfaces shaped in cross-section as the arc of a circle the radius of which is centered on the pitch circle. The tips of the belt teeth and the bases of the pulley cavities are relatively shaped such that upon engagement of the belt with the pulley compressive stress is exerted from each cavity base through each engaging belt tooth.

10 Claims, 4 Drawing Figures

SYNCHRONOUS DRIVE BELT AND PULLEY CONFIGURATION THEREFOR

This invention relates to synchronous drive belts.

These are endless belts upon which teeth are molded, the teeth engaging in cavities in a pulley wheel, thus providing a synchronous drive system. Synchronous drive belts are used extensively in industry and in the automotive industry as timing belts for driving camshafts and auxiliaries on engines.

In such belts a high elastic modulus is desirable in the longitudinal direction so that the belt does not stretch in service, causing the teeth to go out of mesh, and the teeth on the belt should be very securely attached to the carcass of the belt to ensure that they will not be sheared off, under the high loading imposed by the driver. It is also highly desirable that the tooth be of such a form that it may engage smoothly and not interfere with the pulley teeth, thus causing heavy wear of the side of the belt teeth, and noise. The side of the tooth in contact with the side of the pulley tooth is desirably of as large an area as possible, to keep the contact pressure low and thus minimize tooth distortion.

At the present time belt teeth are generally of a trapezoid form. These are limited in width and depth in that if they are too deep, in relation to their own width, their tips will interfere with walls of the tooth cavity, when being engaged and disengaged with it. This therefore limits the contact area. This form also only has point contact with the pulley during engagement, which leads to high stresses in the tooth and consequent distortion. Furthermore, when a trapezoidal tooth is put in shear there is an area of high stress concentration in the root region of the tooth. These factors limit the horse power which can be transmitted through a belt of a given pitch. An object of the present invention is to overcome the deficiencies of the trapezoidal tooth form.

According to the present invention there is provided: (A) an endless synchronous drive belt formed of a resilient elastomer, reinforced with one or more reinforcing members extending along and thereby defining the pitch line, with a succession of identical teeth uniformly spaced apart by their pitch P, wherein each tooth has at least part of its fore and its aft flank surfaces shaped in cross-section as the arc of a circle of radius W, both said arcs being centered on the pitch line at centers spaced at a distance W apart; and (B) a pulley having a plurality of identical peripheral belt-engaging teeth defining between themselves pulley cavities, each pulley cavity having at least part of its fore and its aft surfaces shaped in cross-section as the arc of a circle centered on the pitch circle, the pitch circle radius being the outer radius of the pulley at the pulley tooth periphery plus the distance between the base of the belt between the teeth, and the belt pitch line; wherein the tip of each tooth and the base of each cavity are relatively shaped so that when the belt engages with the pulley compressive stress is exerted from the base of the cavity through each engaging belt tooth.

In general terms therefore this invention resembles that described in our earlier U.S. Pat. No. 3,969,946, issued July 20, 1976 and assigned to The Goodyear Tire & Rubber Company, Akron, Ohio except that within that earlier Patent it is stated that the top of the tooth and the base of the cavity must not interfere, in the present invention it is essential that they should interfere and that compressive stresses should thereby be set up in each engaging tooth.

Preferably, the surfaces of each pulley cavity are of radius $W + xC$ where $x$ is a selectable numerical coefficient and C is the desired flank clearance between belt tooth and pulley cavity, the two surfaces being centered on the pitch circle with centers spaced by $W + (2x-1)C$.

As in our earlier Patent, it will be found convenient if the pulley cavities are based either on arcs of a circle $W + 0.5C$ in radius or upon arcs of a circle which is $W + C$ in radius, i.e. $x = 0.5$ or 1.

The compressive stresses in each tooth can be provided by suitable shaping of the tip of the belt tooth, i.e. by having a protrusion, preferably a smooth arcuate protrusion at the tips of the tooth which will press against the base of the cavity when the belt is in use. Alternatively the base of the cavity can be provided with such a protrusion to press against the tooth. Moreover, it is possible to shape both the base of the cavity and the belt teeth to generate such compressive stresses.

While the Applicants do not wish to be limited by any statement describing the theory behind their invention, it would appear that by exerting compressive stresses on the tooth the resultant radial stresses between the teeth and the circumferential stresses along the sides of the teeth are reduced.

As in our prior Patent, and speaking in general terms, the ratio W:P can lie between 0.33:1 and 0.8:1 to provide belts of useful configurations. Moreover, while such a belt can be made in any size it is preferred for the pitch P to lie between 20mm and 30mm.

The base material is a resilient elastomer reinforced by a longitudinal tension member made up usually of a plurality of cords or a very high elastic modulus. These cords are centered on the belt neutral axis, and define by their position the pitch line. These cords may be made from glass fiber, carbon fiber, steel, polyester, preferably "Aramid," or high tenacity rayon. The tooth face may if required be reinforced with an abrasion resistant fabric, an example of which is nylon. The belt may be made from a variety of elastomers. These include polychloroprene, polyurethane, acrylonitrile rubber and the copolymer isobutylene/isoprene. The pulleys may be made from a variety of materials including metals, sintered metal, thermoset and thermoplastic polymers.

The invention will be further described with reference to the drawings, in which:

FIG. 1 shows diagrammatically the engagement of a belt and pulley as described in our prior U.S. Pat. No. 3,969,946.

Figure 1:
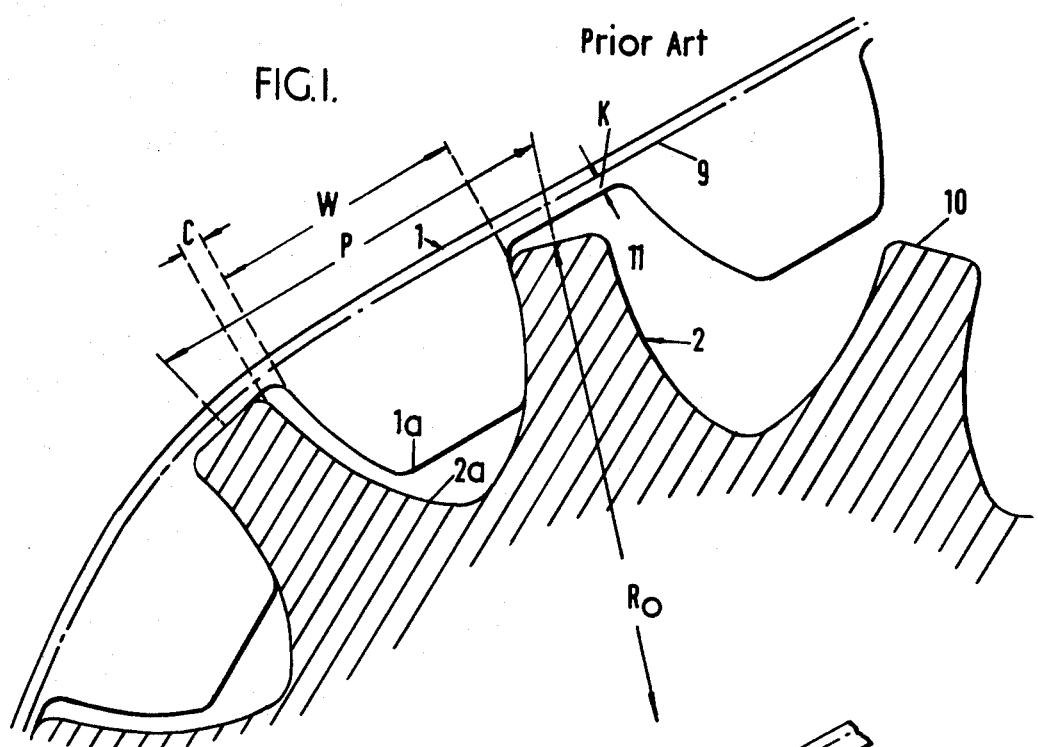

In FIG. 1 a belt 1 is shown engaging with a pulley 2. The pitch of the belt is shown at P, and the width of each tooth as W, with a clearance C between the flank of tooth 1a and the pulley cavity 2a. The shapes of the teeth and cavities are designed and produced as described in our prior Patent.

Specifically, each tooth flank is defined, in cross-section, by a circular arc of radius W centered on the pitch line 9 of the belt, the two arcs defining one tooth having their centers spaced by W. Each pulley cavity is defined by two circular arcs centered on a pitch circle concentric with pulley 2 and of radius equal to the outside radius $R_o$ of the pulley at the tips of the pulley teeth 10 plus the distance K between the belt pitch line and the belt surface 11 between teeth; in other words the belt pitch line is tangential to the pulley pitch circle. In one preferred embodiment the arcs defining the cavity are of radius W+C and their centers are spaced apart by W. In another preferred embodiment these arcs are of radius W + 0.5C and their centers are spaced by W.

Figure 2:
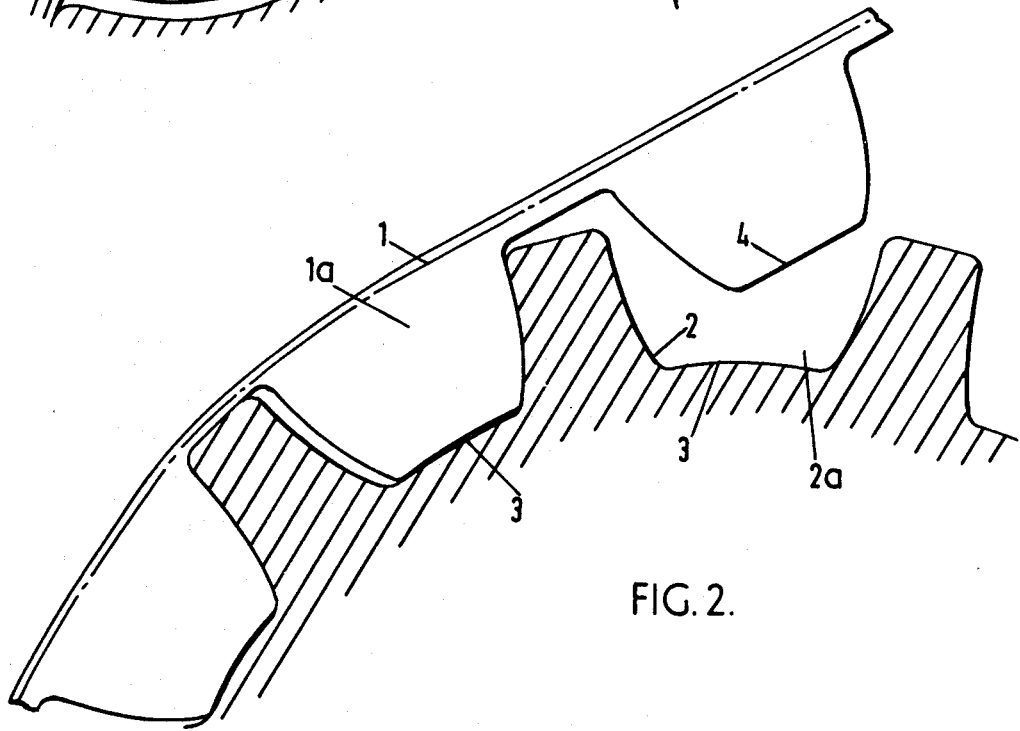
FIG. 2 shows a similar drawing of a first embodiment of the present invention.

In FIG. 2 similar integers are shown with the same numbering. In addition there is shown a convex portion 3 at the base of each pulley cavity 2a with which the flat base 4 of each tooth 1a comes into compressive contact as shown in the upper part of the drawing, thereby generating compressive stress throughout each tooth. This convex portion may or may not be part of the arc of a circle, its precise shape being open to choice provided that there is interference between the belt tooth 1a and the pulley cavity 2a in this region.

Figure 3:
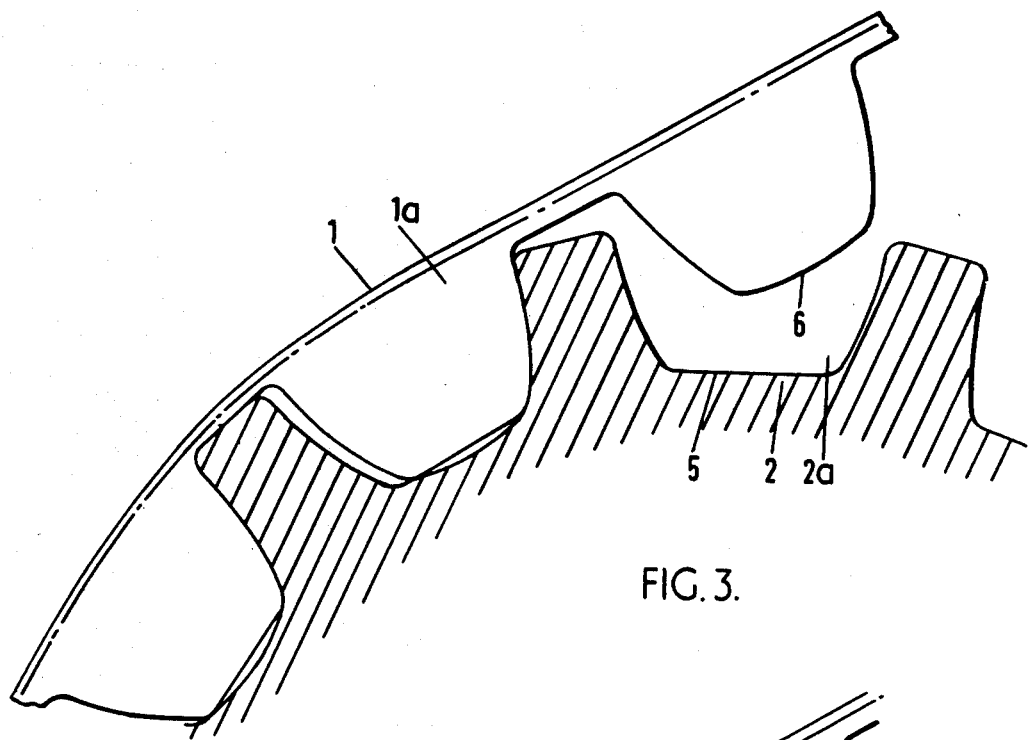
FIG. 3 shows a similar drawing of a second embodiment.

FIG. 3 shows a similar embodiment but in which the base 5 of the pulley cavity 2a is flat and the base 6 of the tooth 1a is convex. Once again this combination of shapes generates compressive stress throughout the tooth.

Figure 4:
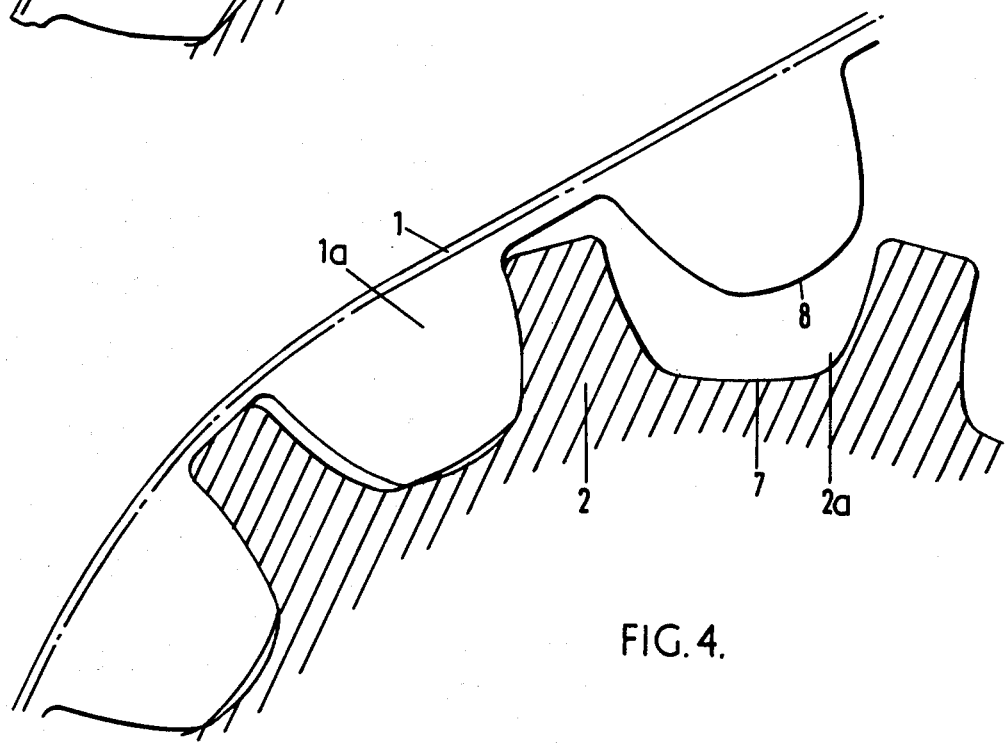
FIG. 4 shows a similar drawing of a third embodiment.

FIG. 4 shows an embodiment in which the base 7 of the cavity 2a is concave and the tip 8 of the belt tooth 1a is convex. However, these do not fit exactly into one another, the tooth tip having a stronger curvature, and as shown in the upper part of the drawing there is compression and interference at the base of the cavity as in the two previous embodiments.

While certain representative embodiments and details have been shown for the purpose of illustrating the invention, it will be apparent to those skilled in this art that various changes and modifications may be made therein without departing from the spirit or scope of the invention.

We claim:

1. In combination, (A) an endless synchronous drive belt formed of a resilient elastomer, reinforced with one or more reinforcing members extending along and thereby defining the pitch line, with a succession of identical teeth uniformly spaced apart by their pitch P, wherein each tooth has at least part of its fore and its aft flank surfaces shaped in cross-section as the arc of a circle of radius W, both said arcs being centered on the pitch line at centers spaced at a distance W apart; and (B) a pulley having a plurality of identical peripheral belt-engaging teeth defining between themselves pulley cavities, each pulley cavity having at least part of its fore and its aft surfaces shaped in cross-section as the arc of a circle centered on the pitch circle, the pitch circle radius being the outer radius of the pulley at the pulley tooth periphery plus the distance between the base of the belt between the teeth, and the belt pitch line; wherein the tip of each tooth and the base of each cavity are relatively shaped so that when the belt engages with the pulley compressive stress is exerted from the base of the cavity through each engaging belt tooth.

2. The combination claimed in claim 1 in which the surfaces of each pulley cavity are of radius $W + xC$ where $x$ is a selectable numerical coefficient and C is the desired flank clearance between belt tooth and pulley cavity, the two surfaces being centered on the pitch circle with centers spaced by $W + (2x - 1)$.

3. The combination claimed in claim 2 in which $x$ is 0.5 or 1.

4. The combination claimed in claim 1, in which the w/P is in the range 0.33 to 0.8.

5. The combination claimed in claim 1 in which each belt tooth has at its tip a protrusion for contacting the bases of the pulley cavities under pressure.

6. The combination claimed in any of claims 1 to 4 in which each pulley cavity has at its base a protrusion for contacting the belt tooth tips under pressure.

7. The combination claimed in claim 6 in which each pulley cavity has a convex base and each belt tooth has a flat tip.

8. The combination claimed in claim 5 in which each pulley cavity has a flat base and each belt tooth has a convex tip.

9. The combination claimed in claim 5 wherein each pulley cavity has a concave base and each belt tooth has a convex tip, the radius of the arc defining a pulley cavity being substantially greater than the radius of the arc defining a tooth tip such that there is interference and compressive contact between the tooth tip and the cavity base.

10. The combination claimed in claim 2 wherein $x \leq 1.0$.

* * * * *